(12) United States Patent
Kim et al.

(10) Patent No.: US 11,380,488 B2
(45) Date of Patent: *Jul. 5, 2022

(54) MULTILAYER ELECTRONIC COMPONENT FOR ENHANCED MOISTURE RESISTANCE AND BENDING STRENGTH

(71) Applicant: SAMSUNG ELECTRO-MECHANICS CO., LTD., Suwon-si (KR)

(72) Inventors: Dong Yeong Kim, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 60 days.

This patent is subject to a terminal disclaimer.

(21) Appl. No.: 16/834,202

(22) Filed: Mar. 30, 2020

(65) Prior Publication Data

US 2021/0065985 A1    Mar. 4, 2021

(30) Foreign Application Priority Data

Aug. 28, 2019    (KR) .................. 10-2019-0105820

(51) Int. Cl.
H01G 4/30 (2006.01)
H01G 4/232 (2006.01)
(Continued)

(52) U.S. Cl.
CPC .............. H01G 4/30 (2013.01); H01G 2/02 (2013.01); H01G 4/008 (2013.01); H01G 4/012 (2013.01);
(Continued)

(58) Field of Classification Search
CPC ............ H01G 4/30; H01G 4/005; H01G 4/14; H01G 4/224; H01G 4/248; H01G 4/252; H01G 4/012
See application file for complete search history.

(56) References Cited

U.S. PATENT DOCUMENTS 5,866,196 A * 2/1999 Ueno ...................... H01C 17/02
427/79
6,171,644 B1 * 1/2001 Jinno ...................... H01C 7/10
427/79
(Continued)

FOREIGN PATENT DOCUMENTS

EP         0229286 A1 *  7/1987  ............. H01G 2/065
KR   20130106568 A  *  9/2013  ........... H01G 4/2325
(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer electronic component includes a silicon (Si) organic compound layer having a body cover portion disposed in a region in which an electrode layer and a conductive resin layer are not disposed, of external surfaces of a body, and an extending portion disposed to extend from the body cover portion between a conductive resin layer and a plating layer of an external electrode, and thus, may improve bending strength and moisture resistance reliability.

24 Claims, 8 Drawing Sheets

(51) Int. Cl.
   *H01G 4/224*   (2006.01)
   *H01G 4/12*    (2006.01)
   *H01G 2/02*    (2006.01)
   *H01G 4/008*   (2006.01)
   *H01G 4/012*   (2006.01)

(52) U.S. Cl.
   CPC ........... *H01G 4/1218* (2013.01); *H01G 4/224* (2013.01); *H01G 4/232* (2013.01)

(56) References Cited

U.S. PATENT DOCUMENTS

| | | | | |
|---|---|---|---|---|
| 6,381,117 | B1* | 4/2002 | Nakagawa | H01G 2/14 |
| | | | | 361/306.3 |
| 8,149,566 | B2* | 4/2012 | Motoki | H01G 4/232 |
| | | | | 361/305 |
| 8,587,923 | B2* | 11/2013 | Ogawa | H01G 4/30 |
| | | | | 361/306.3 |
| 10,242,802 | B2* | 3/2019 | Zenzai | H01G 4/232 |
| 10,276,307 | B2* | 4/2019 | Asano | H01G 4/14 |
| 10,395,838 | B2* | 8/2019 | Asano | H01G 4/2325 |
| 10,541,085 | B2* | 1/2020 | Asano | H01G 4/30 |
| 10,950,385 | B2* | 3/2021 | Fukumura | H01G 4/008 |
| 10,964,478 | B2* | 3/2021 | Asano | H05K 1/181 |
| 2008/0151470 | A1* | 6/2008 | Motoki | H01G 4/30 |
| | | | | 361/303 |
| 2010/0290172 | A1* | 11/2010 | Motoki | H01G 4/2325 |
| | | | | 361/305 |
| 2010/0302704 | A1* | 12/2010 | Ogawa | H01G 4/2325 |
| | | | | 361/306.3 |
| 2015/0077898 | A1* | 3/2015 | Chung | H01G 4/232 |
| | | | | 361/301.4 |
| 2017/0256359 | A1* | 9/2017 | Masunari | H01G 4/30 |
| 2018/0082785 | A1* | 3/2018 | Asano | H01G 4/30 |
| 2018/0082786 | A1* | 3/2018 | Asano | H01G 4/30 |
| 2018/0082787 | A1* | 3/2018 | Hamamori | H01G 4/005 |
| 2018/0082788 | A1* | 3/2018 | Asano | H01G 4/232 |
| 2018/0082789 | A1* | 3/2018 | Asano | H01G 4/232 |
| 2018/0174753 | A1* | 6/2018 | Terashita | H01G 4/232 |
| 2019/0131076 | A1* | 5/2019 | Fukumura | H01G 4/2325 |

FOREIGN PATENT DOCUMENTS

| | | |
|---|---|---|
| KR | 10-2019-0019793 A | 2/2019 |
| KR | 10-2019-0049479 A | 5/2019 |

\* cited by examiner

MULTILAYER ELECTRONIC COMPONENT FOR ENHANCED MOISTURE RESISTANCE AND BENDING STRENGTH

CROSS-REFERENCE TO RELATED APPLICATION(S)

The present application claims the benefit of priority to Korean Patent Application No. 10-2019-0105820 filed on Aug. 28, 2019 in the Korean Intellectual Property Office, the entire disclosure of which is incorporated herein by reference.

TECHNICAL FIELD

The present disclosure relates to a multilayer electronic component.

BACKGROUND

A multilayer ceramic capacitor (MLCC), a type of multilayer electronic component, may be a chip type capacitor mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In addition, as recent interest in vehicle electric/electronic components has increased, multilayer ceramic capacitors have also come to require relatively high reliability and strength characteristics to be used in vehicle or infotainment systems.

In order to secure high-reliability and high-strength characteristics, a method of changing a conventional external electrode, including an electrode layer, to have a double-layer structure including an electrode layer and a conductive resin layer has been proposed. In the double-layer structure including the electrode layer and the conductive resin layer, a resin composition, including a conductive material, is applied onto the electrode layer to absorb external impacts and to prevent permeation of plating liquid. As a result, reliability may be improved.

However, as electric vehicles, autonomous vehicles, and the like, have been developed in the automotive industry, a greater number of multilayer ceramic capacitors are required and multilayer ceramic capacitors, used in automobiles and the like, are required to have stricter moisture resistance reliability conditions and bending strength characteristics secured therein.

SUMMARY

An aspect of the present disclosure is to provide a multilayer electronic component having improved bending strength characteristics.

An aspect of the present disclosure is to provide a multilayer electronic component having improved moisture resistance reliability.

An aspect of the present disclosure is to provide a multilayer electronic component having low equivalent series resistance (ESR).

However, the objects of the present disclosure are not limited to the above, and will be more easily understood in the process of describing specific embodiments of the present disclosure.

According to an aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other, a first external electrode including a first electrode layer connected to the first internal electrode, a first conductive resin layer disposed on the first electrode layer, and a first plating layer disposed on the first conductive resin layer, and each having a first connection portion disposed on the third surface of the body and a first band portion extending from the first connection portion to a portion of each of the first, second, fifth, and sixth surfaces, a second external electrode including a second electrode layer connected to the second internal electrode, a second conductive resin layer disposed on the second electrode layer, and a second plating layer disposed on the second conductive resin layer, and each having a second connection portion disposed on the fourth surface of the body and a second band portion extending from the second connection portion to a portion of each of the first, second, fifth, and sixth surfaces, and a silicon (Si) organic compound layer having a body cover portion disposed on a region of external surfaces of the body between the first and second conductive resin layers, a first extending portion disposed to extend from the body cover portion to a region between the first band portion of the first conductive resin layer and the first band portion of the first plating layer, and a second extending portion disposed to extend from the body cover portion to a region between the second band portion of the second conductive resin layer and the second band portion of the second plating layer.

According to an aspect of the present disclosure, a multilayer electronic component includes a body including dielectric layers, and first and second internal electrodes alternately stacked with respective dielectric layers interposed therebetween, and having first and second surfaces opposing each other in a stacking direction, third and fourth surfaces connected to the first and second surfaces and opposing each other, and fifth and sixth surfaces connected to the first to fourth surfaces and opposing each other, a first external electrode including a first electrode layer connected to the first internal electrode, a first conductive resin layer disposed on the first electrode layer, and a first plating layer disposed on the first conductive resin layer, and each having a first connection portion disposed on the third surface of the body and a first band portion extending from the first connection portion to a portion of each of the first, second, fifth, and sixth surfaces, a second external electrode including a second electrode layer connected to the second internal electrode, a second conductive resin layer disposed on the second electrode layer, and a second plating layer disposed on the second conductive resin layer, and each having a second connection portion disposed on the fourth surface of the body and a second band portion extending from the second connection portion to a portion of each of the first, second, fifth, and sixth surfaces, and a silicon (Si) organic compound layer having a body cover portion disposed on a region between the first and second conductive resin layers, a first extending portion disposed to extend from the body cover portion to a region between the first plating layer and the first conductive resin layer, and a second extending portion disposed to extend from the body cover portion to a region between the second plating layer and the second conductive resin layer. The first and second extending portions have first and second openings, respectively.

According to an aspect of the present disclosure, a multilayer electronic component includes a body including dielectric layers, and first and second internal electrodes alternately stacked with a respective dielectric layer interposed therebetween in a stacking direction, the first and second internal electrodes being exposed to opposing end surfaces of the body in a length direction perpendicular to the stacking direction, first and second external electrodes comprising: first and second electrode layers disposed on the end surfaces of the body and connected to the first and second internal electrodes, respectively, the first and second electrode layers further extending inwardly in the length direction along surfaces of the body that connect the end surfaces to each other; first and second conductive resin layers to cover the first and second electrode layers, respectively; and first and second plating layers to cover the first and second conductive resin layers, respectively, and a silicon (Si) organic compound layer disposed to cover exterior surfaces of the body, the first and second electrode layers, and the first and second conductive resin layers. The Si organic compound layer has one or more first openings between the first conductive resin layer and the first plating layer such that the first conductive resin layer and the first plating layer are in contact through the one or more first openings, and has one or more second openings between the second conductive resin layer and the second plating layer such that the second conductive resin layer and the second plating layer are in contact through the one or more second openings.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
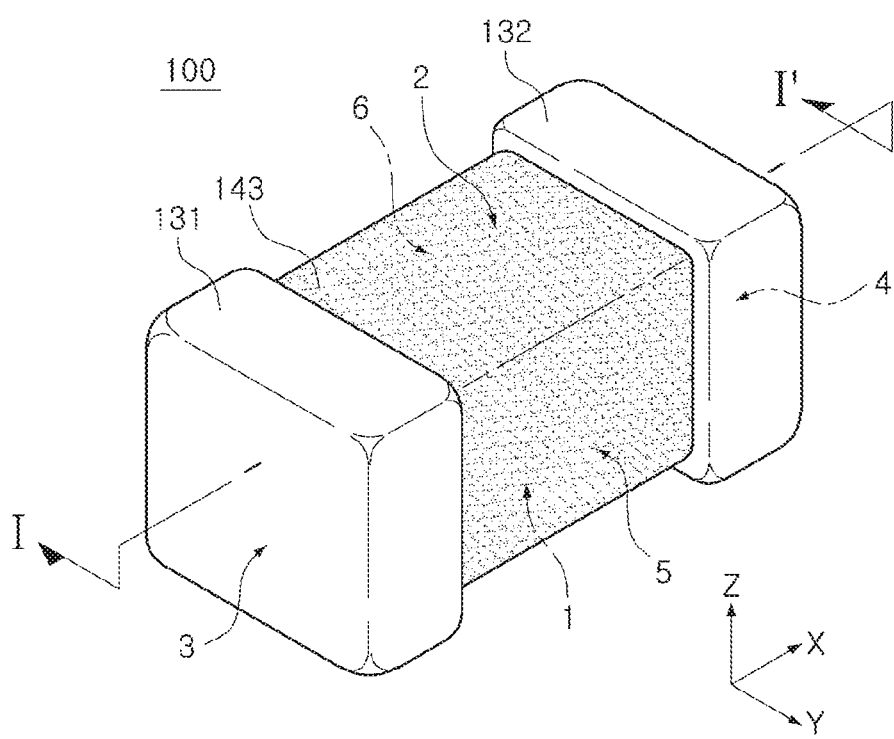
FIG. 1 is a schematic perspective view of a multilayer electronic component according to an exemplary embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

Figure 2:
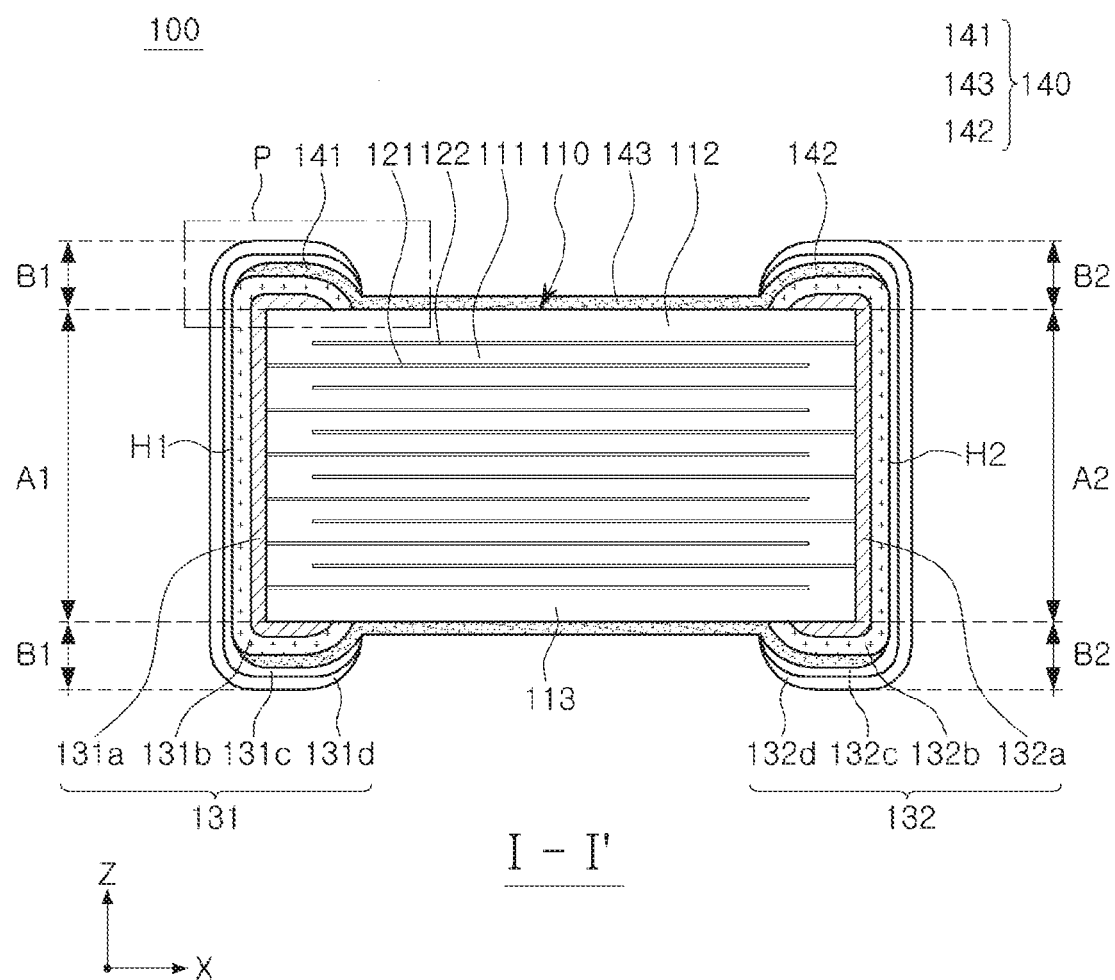
FIG. 2 is a cross-sectional view taken along line I-I' in FIG. 1.

FIG. 1 is a schematic perspective view of a multilayer electronic component according to an exemplary embodiment. FIG. 2 is a cross-sectional view taken along line I-I' in FIG. 1.

Figure 3:
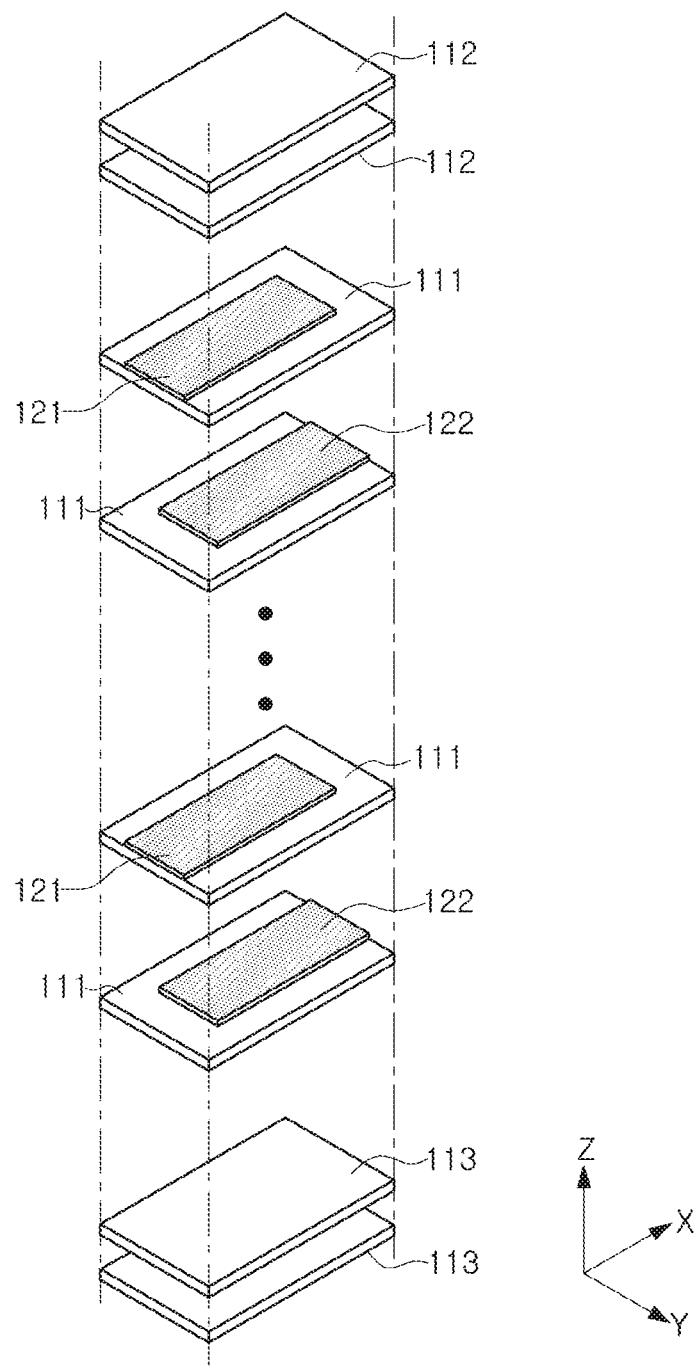
FIG. 3 is a schematic exploded perspective view of a body, in which dielectric layers and internal electrodes are stacked, according to an exemplary embodiment of the present disclosure.

FIG. 3 is a schematic exploded perspective view of a body, in which dielectric layers and internal electrodes are stacked, according to an exemplary embodiment.

Figure 4:
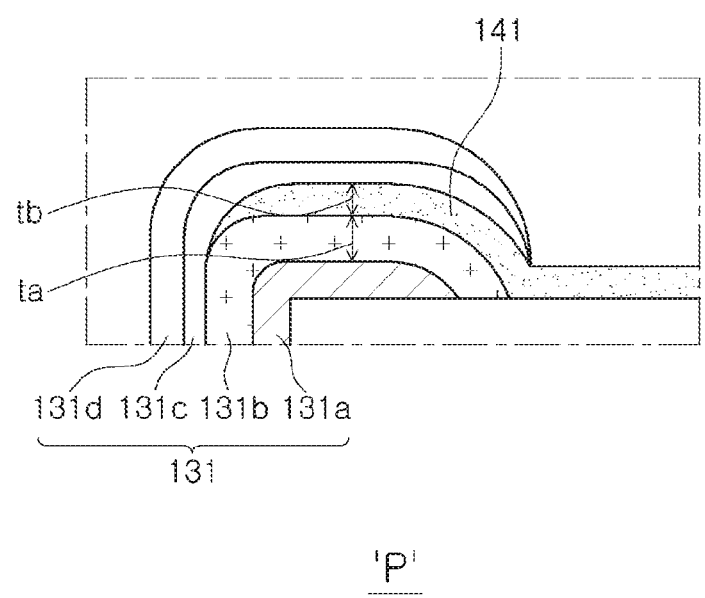
FIG. 4 is an enlarged view of region P in FIG. 2.

FIG. 4 is an enlarged view of region P in FIG. 2.

Hereinafter, a multilayer electronic component 100 according to an exemplary embodiment will be described with reference to FIGS. 1 to 4.

A multilayer electronic component 100 according to an exemplary embodiment may include a body 110 including dielectric layers 111, and first and second internal electrodes 121 and 122 alternately stacked with respective dielectric layers interposed therebetween, and having first and second surfaces 1 and 2 opposing each other in a stacking direction, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other, a first external electrode 131 including a first electrode layer 131a connected to the first internal electrode 131, a first conductive resin layer 131b disposed on the first electrode layer 131a, a first plating layer 131c disposed on the first conductive resin layer 131b, and having a first connection portion A1 disposed on the third surface 3 of the body 110 and a first band portion B1 extending from the first connection portion A1 to a portion of each of the first, second, fifth, and sixth surfaces 1, 2, 5, and 6, a second external electrode 132 including a second electrode layer 132a connected to the second internal electrode 122, a second conductive resin layer 132b disposed on the second electrode layer 132a, and a second plating layer 132c disposed on the second conductive resin layer 132b, and having a second connection portion A2 disposed on the fourth surface 4 of the body 110 and a second band portion B2 extending from the second connection portion A2 to a portion of each of the first, second, fifth, and sixth surfaces 1, 2, 5, and 6, and a silicon (Si) organic compound layer 140 having a body cover portion 143 disposed in a region in which the first and second electrode layers 131a and 132a and the first and second conductive resin layers 131b and 132b are not disposed, of external surfaces of the body 110, a first extending portion 141 disposed to extend from the body cover portion 143 between the first conductive resin layer 131b and the first plating layer 131c of the first band portion B1, and a second extending portion 142 disposed to extend from the body cover portion 143 between the second conductive resin layer 131b and the second plating layer 132c of the second band portion B2.

In the body 110, the dielectric layers 111 and the internal electrodes 121 and 122 are alternately stacked.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (a Z direction), the third and fourth surfaces 3 and 4 connected to the first and second surfaces 1 and 2 and opposing each other in a width direction (a Y direction), and the fifth and sixth surfaces 5 and 6 connected to the first and second surfaces 1 and 2 and as well as to the third and fourth surfaces 3 and 4 and opposing each other in a length direction (an X direction).

The plurality of dielectric layers 111, constituting the body 110, is in a sintered state and may be integrated with each other such that boundaries therebetween may not be readily apparent without using a scanning electron microscope (SEM).

According to an exemplary embodiment, a raw material forming the dielectric layer 111 is not limited as long as sufficient capacitance may be obtained. For example, a barium titanate-based material, a lead composite perovskite-based material, a strontium titanate-based material, or the like, may be used.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 may have a capacitance forming portion disposed in the body 110 and including the first and second internal electrode layers 121 and 122, disposed to oppose each other with the dielectric layer 111 interposed therebetween, to form capacitance, and upper and lower protective layers 112 and 113 disposed above and below the capacitance forming portion.

The capacitance forming portion may contribute to capacitance formation of a capacitor, and may be formed by repeatedly laminating the plurality of first and second internal electrode layers 121 and 122 with the dielectric layer 111 interposed therebetween.

The upper protective layer 112 and the lower protective layer 113 may be formed by laminating a single dielectric layer or two or more dielectric layers on upper and lower surfaces of the capacitance forming portion, respectively, in the vertical direction, and may basically play a role in preventing damage to the internal electrodes due to physical or chemical stress.

The upper protective layer 112 and the lower protective layer 113 may not include an internal electrode, and may include the same material as the dielectric layer 111.

The plurality of internal electrodes 121 and 122 may be disposed to oppose each other with the dielectric layer 111 interposed therebetween.

The internal electrodes 121 and 122 may include first and second internal electrode 121 and 122 alternately disposed to oppose each other with respective dielectric layers interposed therebetween.

The first and second internal electrodes 121 and 122 may be exposed to the third and fourth surfaces 3 and 4, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 is not connected to the second external electrode 132 and is connected to the first external electrode 131, and the second internal electrode 122 is not connected to the first external electrode 131 and is connected to the second external electrode 132. Thus, the first internal electrode 121 is formed to be spaced apart from the fourth surface 4 by a predetermined distance, and the second internal electrode 122 is formed to be spaced apart from the third surface 3 by a predetermined distance.

The first and second internal electrodes 121 and 122 may be electrically isolated from each other by the dielectric layer 111 disposed therebetween.

Referring to FIG. 3, the body 110 may be formed by alternately laminating the dielectric layer 111, on which the first internal electrode 121 is printed, and the dielectric layer 111, on which the second internal electrode 122 is printed, in a thickness direction (a Z direction) and sintering the dielectric layers 111 and 122.

The material forming the first and second internal electrodes 121 and 122 is not limited. For example, the first and second internal electrodes 121 and 122 may be formed using a conductive paste containing a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

The external electrodes 131 and 132 are disposed on the body 110 and include electrode layers 131a and 132a, conductive resin layers 131b and 132b, and plating layers 131c and 132c.

The external electrodes 131 and 132 may include first and second external electrodes 131 and 132, respectively connected to the first and second internal electrodes 121 and 122.

The first external electrode 131 may include a first electrode layer 131a, a first conductive resin layer 131b, and a first plating layer 131c, and the second external electrode 132 may include a second electrode layer 132a, a second conductive resin layer 132b, and a second plating layer 132c.

When the first external electrode 131 is divided depending on a position in which it is disposed, the first external electrode 131 has a first connection portion A1, disposed on the third surface 3 of the body, and a band portion B1 extending from the first connection portion A1 to a portion of the first, second, fifth, and sixth surfaces 1, 2, 5, and 6.

When the second external electrode 132 is divided depending on a position in which it is disposed, the second external electrode 132 has a second connection portion A2, disposed on the fourth surface 4 of the body, and a band portion B2 extending from the second connection portion A2 to a portion of the first, second, fifth, and sixth surfaces 1, 2, 5, and 6.

The first and second electrode layers 131 and 132 may be formed using any material as long as it is a material having electrical conductivity such as a metal or the like, and a specific material may be determined in consideration of electrical characteristics, structural stability, and the like.

For example, the first and second electrode layers 131 and 132 may include a conductive metal and glass.

A conductive metal, used for the electrode layers 131a and 132a, is not limited as long as it may be electrically connected to the internal electrode to form capacitance and may include at least one selected from the group consisting of, for example, copper (Cu), silver (Ag), nickel (Ni), and alloys thereof.

The electrode layers 131a and 132a may be formed by applying a conductive paste, prepared by adding a glass frit, to the conductive metal powder particles and sintering the conductive paste.

When the first and second electrode layers 131a and 132a include a conductive metal and glass, corner portions, at which the connection portions A1 and A2 and the band portions B1 and B2 meet, may be formed to be thin, or lifting may occur between ends of the band portions B1 and B2 and the body 110. Therefore, since moisture resistance reliability may be problematic, an effect of improving the moisture reliability may be more effective when the first and second electrode layers 131 and 132 include a conductive metal and glass.

The first and second electrode layers 131a and 132a may be formed by means of atomic layer deposition (ALD), molecular layer deposition (MLD), chemical vapor deposition (CVD) sputtering, or the like.

In addition, the first and second electrode layers 131a and 132a may be formed by transferring a sheet, including a conductive metal, onto the body 110.

The conductive resin layers 131b and 132b may include a conductive metal and a base resin.

The conductive metal, included in the conductive resin layers 131b and 132b, serves to electrically connect the conductive resin layers 131b and 132b to the first plating layers 131b and 132b.

The conductive metal, included in the conductive resin layers 131b and 132b, is not limited as long as it may be electrically connected to the first plating layers 131b and 132b and may include at least one selected from the group consisting of, for example, copper (Cu), silver (Ag), nickel (Ni), and alloys thereof.

The conductive metal, included in the conductive resin layers 131b and 132b, may include at least one of spherical powder particles and flake powder particles. For example, the conductive metal may include only flake powder particles, or spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) is 1.45 or less.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impact.

The base resin, included in the conductive resin layers 131b and 132b, is not limited as long as it has adhesion and impact absorption and is mixed with conductive metal powder particles to prepare a paste and may include, for example, an epoxy-based resin.

The first and second plating layers 131c and 132c serve to improve mounting characteristics. In addition, when bending stress is generated, the first and second plating layers 131c and 132c may be peeled off to serve to prevent bending cracking.

The first plating layer 131c may be a nickel (Ni) plating layer or a tin (Sn) plating layer, and the second plating layer 132c may also be a Ni plating layer or a Sn plating layer.

First and second additional plating layers 131d and 132d may be further disposed on the first and second plating layers 131c and 132c, respectively. In this case, the first and second plating layers 131c and 132c may be Ni plating layers, and the first and second additional plating layers 131d and 132d may be Sn plating layers.

The first and second plating layers 131c and 132c may include a plurality of Ni plating layers and/or a plurality of Sn plating layers.

The Si organic compound layer 140 has a body cover portion 143 disposed in a region in which the first and second electrode layers 131a and 132a and the first and second conductive resin layers 131b and 132b are not disposed, of external surfaces of the body 110, a first extending portion 141 disposed to extend from the body cover portion 143 between the first conductive resin layer 131b and the first plating layer 131c of the first band portion B1, and a second extending portion 142 disposed to extend from the body cover portion 143 between the second conductive resin layer 131b and the second plating layer 132c of the second band portion B2.

The Si organic compound layer 140 serves to prevent stress, generated when a substrate is deformed by thermal and physical impacts while the multilayer electronic component 100 is mounted on the substrate, from propagating to the body 110 and to prevent cracking.

In addition, the Si organic compound layer 140 serves to improve moisture resistance by blocking a moisture permeation path.

The base resin, included in the conductive resin layers 131b and 132b, also plays a role in absorbing impacts, but the role of the base resin is limited because the first conductive resin layer 131b and the second conductive resin layer 132b must be disposed to be insulated.

Meanwhile, since the body cover portion 143 does not include a conductive metal and is disposed in the region in which the first and second electrode layers 131a and 132a of the external surface of the body 110 are not disposed, the body cover portion 143 is disposed in a wider region to be more effective in absorbing impact and suppressing stress propagation.

In addition, the body cover portion 143 may prevent moisture from permeating into the body 110 through the external surface of the body 100 by sealing fine pores or cracking of the body 110.

The first extending portion 141 is disposed to extend from the body cover portion 143 between the first plating layer 131c and the first conductive resin layer 131b of the first band part B1, serving to suppress stress propagation to the body 110 and to prevent cracking.

In addition, the first extending portion 141 serves to suppress lifting between an end of the first electrode layer 131a, disposed on the first band portion B1, and the body 110 to improve moisture resistance reliability.

The second extending portion 142 is disposed to extend from the body cover portion 143 between the second plating layer 132c and the second conductive resin layer 132b of the second band portion B2, serving to suppress stress propagation to the body 110 and to prevent cracking.

In addition, the second extending portion 142 serves to improve moisture resistance reliability by suppressing lifting between an end of the second electrode layer 132a, disposed in the second band portion B2, and the body 110.

In addition, since the extending portions 141 and 142 of the Si organic compound layer 140 have low bonding strength with the plating layers 131c and 132c, peel-off of the plating layers 131c and 132c is induced when bending stress is generated. Thus, the extending portions 141 and 142 may serve to prevent bending cracking.

However, when the bonding force between the extending portions 141 and 142 and the plating layers 131c and 132c is too low, peel-off may occur even at low bending stress, and thus, bending cracking may not be effectively prevented.

Accordingly, openings may be formed in the first and second extending portions 141 and 142 such that the plating layers 131c and 132c are brought into contact with the conductive resin layers 131b and 132b through the openings. Thus, predetermined bonding force may be secured to more effectively prevent bending cracking.

The Si organic compound layer 140 may be formed by forming the first and second electrode layers 131a and 132a on the body 110 including dielectric layers and internal electrodes, forming the first and second conductive resin layers 131b and 132b on the first and second electrode layers 131a and 132a, respectively, forming a silicon (Si) organic compound layer 140 on an exposed external surface of the body 110 and the connection portions A1 and A2 of the first and second conductive resin layers 131b and 132b, and removing the Si organic compound layer 140 formed on the connection portions A1 and A2 of the first and second conductive resin layers 131b and 132b.

A method of removing the organic compound layer 140 may be, for example, laser processing, mechanical polishing, dry etching, wet etching, shadowing deposition using a tape protective layer, or the like.

The Si organic compound layer 140 may include alkoxy silane.

Accordingly, the Si organic compound layer 140 has a polymeric form including a plurality of silicon carbide bonding structures, and has hydrophobicity.

The alkoxy silane prevents moisture permeation and contamination, and permeates into various inorganic substrates and is then cured to protect products and to increase durability. In addition, the alkoxy silane may react with a hydroxyl group (OH), and thus, may form a strong chemical bond to improve durability.

As compared with an epoxy resin or an inorganic compound, the epoxy resin is difficult to effectively suppress moisture permeation because it has no water repellent effect, a large amount of $CO_2$ gas may be generated during curing to cause lifting, and the inorganic compound has no functional group capable of reacting with a hydroxyl group when applied to a surface of the body 110, and thus, it is difficult to adhere to the surface of the body 110 and a chemical bond is not formed. Accordingly, it may be difficult to apply the epoxy resin or the inorganic compound to the present disclosure.

Therefore, as the Si organic compound layer 140 may include alkoxy silane, an effect of sealing fine pores or cracking may be further improved and bending stress and moisture resistance reliability may be further improved.

When a thickness of the first conductive resin layer 131b on the first electrode layer 131a of the first band portion B1 is defined as Ta and a thickness of the first extending portion 141 is defined as Tb, Tb/Ta may be 0.5 or more to 0.9 or less.

FIG. 4 is an enlarged view of region P in FIG. 2. Referring to FIG. 4, thicknesses of the first conductive resin layer 131b and the first extending portion 141 on the first electrode layer 131a of the first band portion B1 will be described in detail. However, the above detailed description may be identically applied to thicknesses of the second conductive resin layer 132b and the second extending portion 142 on the second electrode layer 132a of the second band portion B2.

After preparing sample chips while changing the ratio of the thickness Tb of the first extending portion 141 to the thickness Ta of the first conductive resin layer 131b on the first electrode layer 131a of the first band portion B1 (Tb/Ta), bending strength and equivalent series resistance (ESR) were evaluated, and the results are shown in Tables 1 and 2, respectively.

The bending strength was measured using a bending strength measuring method through a piezoelectric effect. After mounting samples of a multilayer ceramic capacitor on a substrate, a distance from a central portion pressed during bending was set to be 6 mm to observe whether cracking occurred in the sample chips. The number of sample chips, in which cracking occurred, to the total number of sample chips is shown.

According to the ESR evaluation, a sample chip was maintained at a temperature of −55° C. for 30 minutes and increased to a temperature of 125° C. and was then maintained for 30 minutes, one cycle. After 500 cycles were applied, a sample having ESR greater than 50 mΩ was determined to be defective. The number of sample chips having defective ESR to the total number of sample chips was shown.

TABLE 1

| | | Bending Strength Evaluation | | | | | |
|---|---|---|---|---|---|---|---|
| No. | Tb/Ta | A Lot | B Lot | C Lot | D Lot | E Lot | Sum |
| 1 | 0.3 | 0/60 | 2/60 | 1/60 | 2/60 | 0/60 | 3/300 |
| 2 | 0.5 | 0/60 | 0/60 | 0/60 | 0/60 | 0/60 | 0/300 |
| 3 | 0.7 | 0/60 | 0/60 | 0/60 | 0/60 | 0/60 | 0/300 |
| 4 | 0.9 | 0/60 | 0/60 | 0/60 | 0/60 | 0/60 | 0/300 |
| 5 | 1.1 | 0/60 | 0/60 | 0/60 | 0/60 | 0/60 | 0/300 |
| 6 | 1.3 | 0/60 | 0/60 | 0/60 | 0/60 | 0/60 | 0/300 |

Referring to Table 1, in Test No. 1 in which Tb/Ta was 0.3, cracking occurred in three sample chips among a total of 300 sample chips.

On the other hand, in Test Nos. 2 to 6 in which Tb/Ta was 0.5 or more, there was no sample chip in which cracking occurred. Accordingly, bending strength was excellent.

TABLE 2

| No. | Tb/Ta | ESR Evaluation | | | | | |
|---|---|---|---|---|---|---|---|
| | | A Lot | B Lot | C Lot | D Lot | E Lot | Sum |
| 1 | 0.3 | 0/320 | 0/320 | 0/320 | 0/320 | 0/320 | 0/1600 |
| 2 | 0.5 | 0/320 | 0/320 | 0/320 | 0/320 | 0/320 | 0/1600 |
| 3 | 0.7 | 0/320 | 0/320 | 0/320 | 0/320 | 0/320 | 0/1600 |
| 4 | 0.9 | 0/320 | 0/320 | 0/320 | 0/320 | 0/320 | 0/1600 |
| 5 | 1.1 | 0/320 | 0/320 | 5/320 | 0/320 | 0/320 | 5/1600 |
| 6 | 1.3 | 0/320 | 7/320 | 2/320 | 3/320 | 0/320 | 12/1600 |

Referring to Table 2, in Test No. 5 in which Tb/Ta was 1.1, an ESR defect occurred in five sample chips among a total of 1600 sample chips. In Test No. 6 in which Tb/Ta was 1.3, an ESR defect occurred in twelve sample chips among a total of 1600 sample chips.

On the other hand, In Test Nos. 1 to 4 in which Tb/Ta was 0.9 or less, there was no sample chip in which an ESR defect occurred. Accordingly, ESR characteristics were excellent.

Therefore, to secure excellent ESR characteristics while improving bending strength, the ratio of the thickness Tb of the first extending portion 141 to the thickness Ta of the first conductive resin layer 131b on the first electrode layer 131a of the first band portion B1 (Tb/Ta) may be, in detail, 0.5 or more to 0.9 or less.

Figure 5:
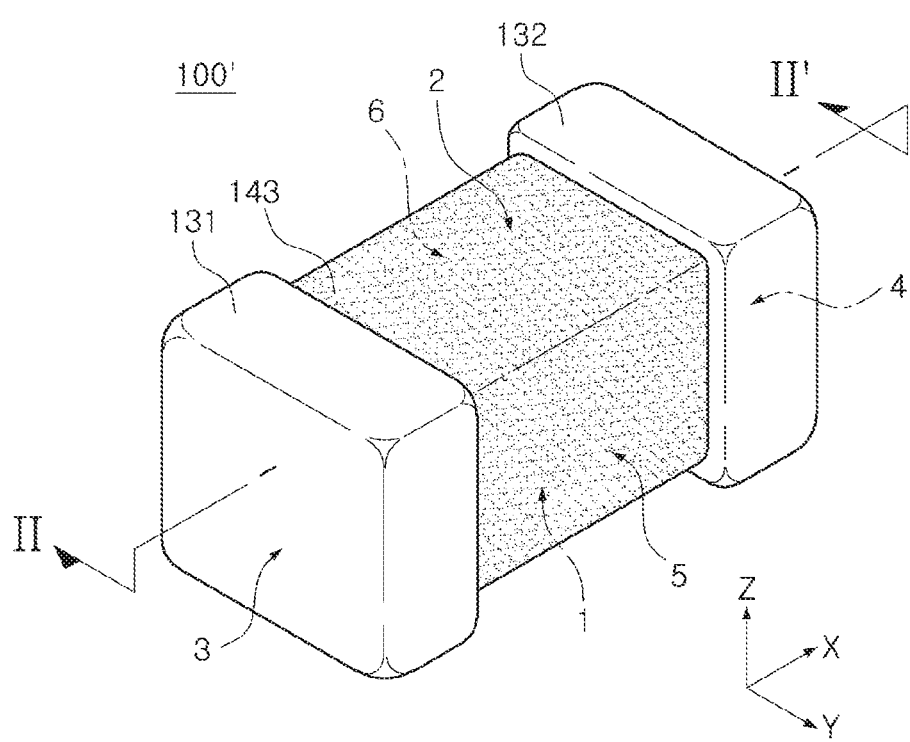
FIG. 5 is a schematic perspective view of a multilayer electronic component according to another exemplary embodiment of the present disclosure.

FIG. 5 is a schematic perspective view of a multilayer electronic component according to another exemplary embodiment.

Figure 6:
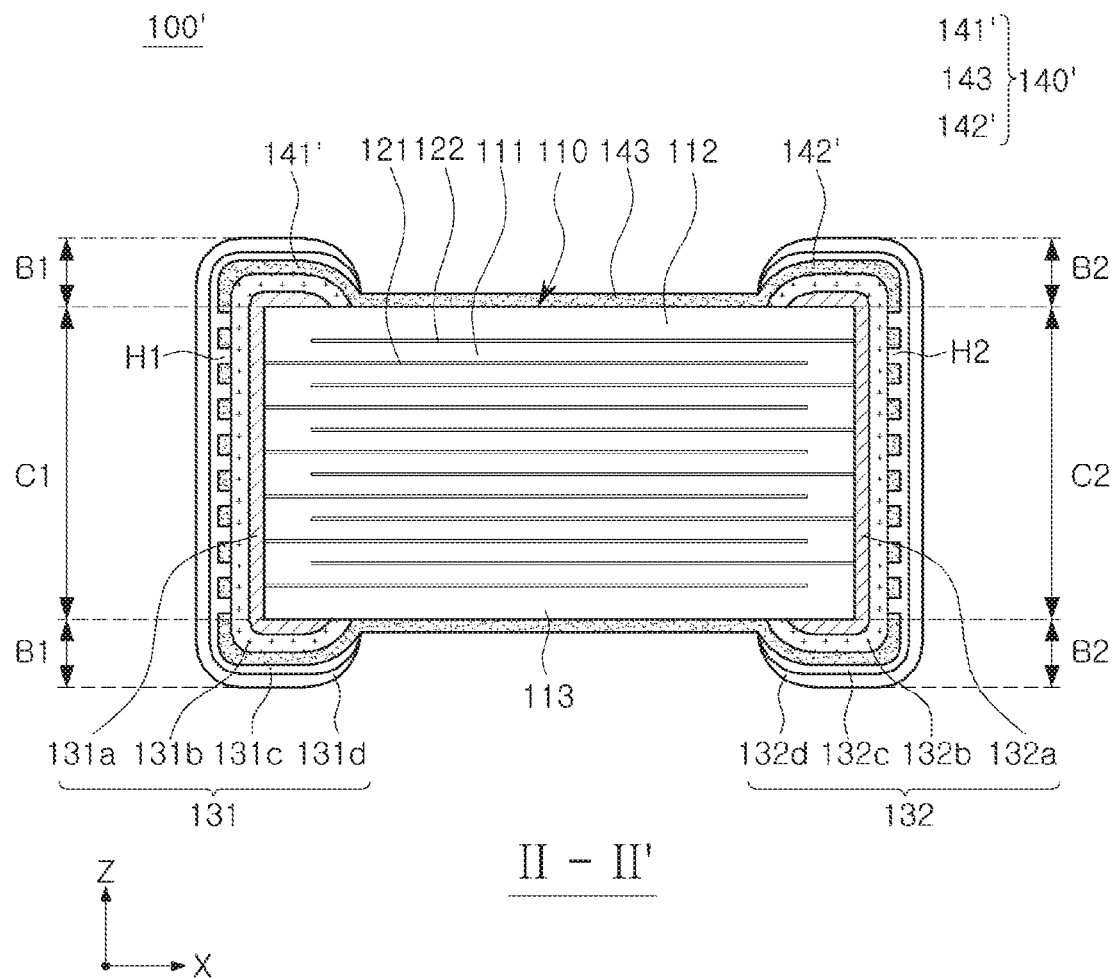
FIG. 6 is a cross-sectional view taken along line II-II' in FIG. 5.

FIG. 6 is a cross-sectional view taken along line II-II' in FIG. 5.

Figure 7:
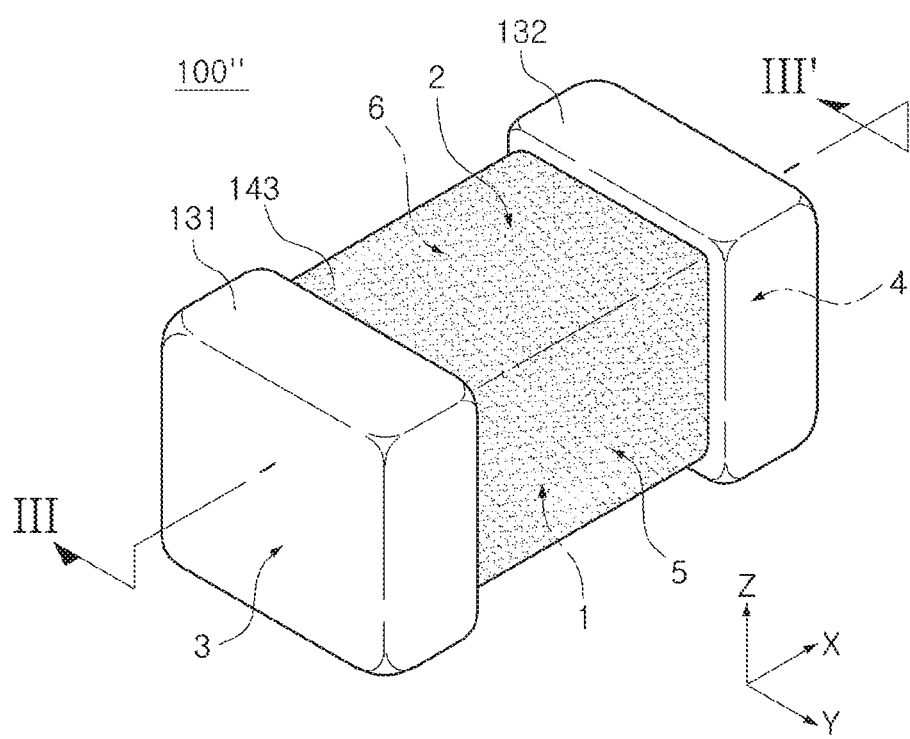
FIG. 7 is a schematic perspective view illustrating a modified example of a multilayer electronic component according to another exemplary embodiment of the present disclosure.

FIG. 7 is a schematic perspective view illustrating a modified example of a multilayer electronic component according to another exemplary embodiment.

Figure 8:
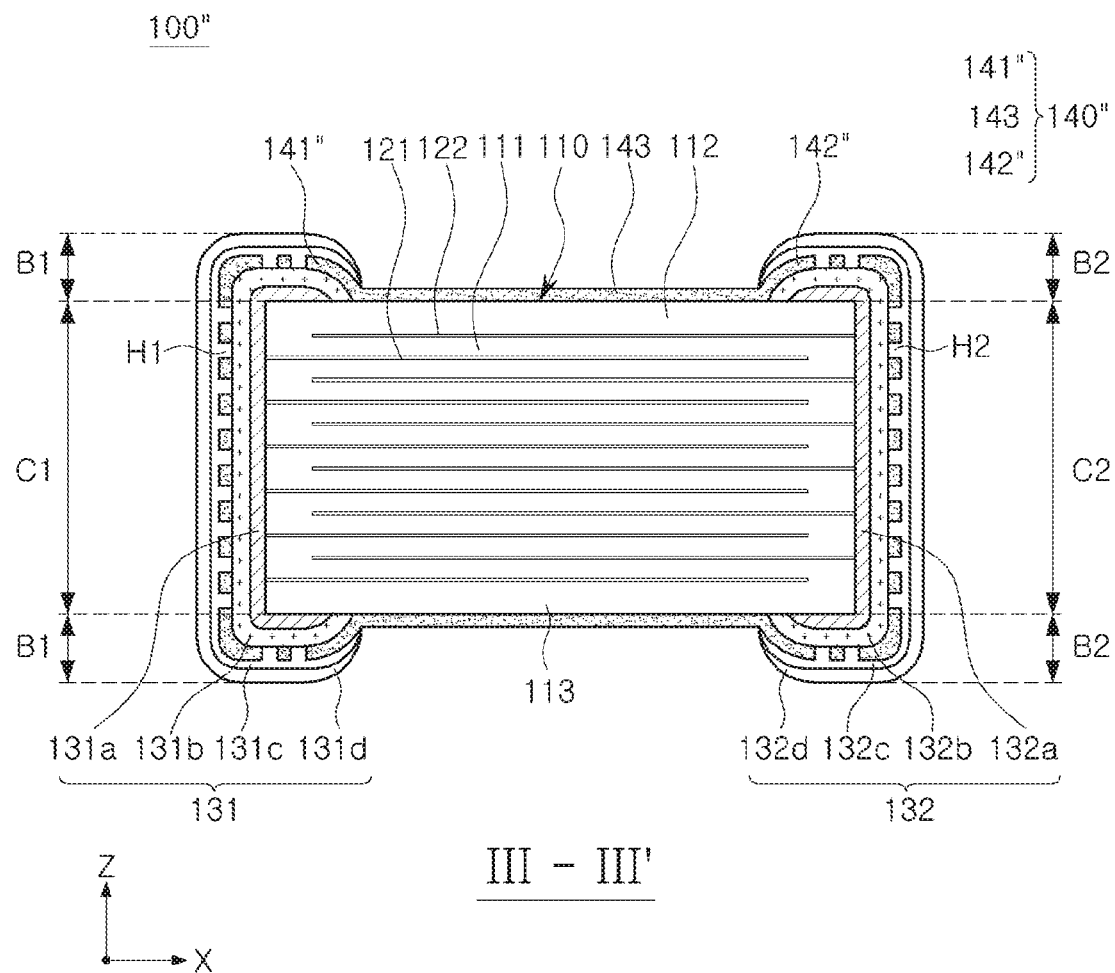
FIG. 8 is a cross-sectional view taken along line III-III' in FIG. 7.

FIG. 8 is a cross-sectional view taken along line III-III' in FIG. 7.

Hereinafter, a multilayer electronic component 100' according to another exemplary embodiment and a modified example 100" thereof will be described with reference to FIGS. 5 to 8. However, descriptions common to the multilayer electronic component 100 according to the embodiment will be omitted to avoid duplicate descriptions.

A multilayer electronic component 100' according to an exemplary embodiment may include a body 110 including dielectric layers 111, and first and second internal electrodes 121 and 122 alternately stacked with respective dielectric layers interposed therebetween, and having first and second surfaces 1 and 2 opposing each other in a stacking direction, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other, a first external electrode 131 including a first electrode layer 131a connected to the first internal electrode 131, a first conductive resin layer 131b disposed on the first electrode layer 131a, a first plating layer 131c disposed on the first conductive resin layer 131b, and having a first connection portion C1 disposed on the third surface 3 of the body 110 and a first band portion B1 extending from the first connection portion C1 to a portion of each of the first, second, fifth, and sixth surfaces 1, 2, 5, and 6, a second external electrode 132 including a second electrode layer 132a connected to the second internal electrode 122, a second conductive resin layer 132b disposed on the second electrode layer 122, and a second plating layer 132c disposed on the second conductive resin layer 132b, and having a second connection portion C2 disposed on the fourth surface 4 of the body 110 and a second band portion B2 extending from the second connection portion C2 to a portion of each of the first, second, fifth, and sixth surfaces 1, 2, 5, and 6, and a silicon (Si) organic compound layer 140' having a body cover portion 143 disposed in a region in which the first and second electrode layers 131a and 132a and the first and second conductive resin layers 131b and 132b are not disposed, of external surfaces of the body 110, a first extending portion 141' disposed to extend from the body cover portion 143 between the first plating layer 131c and the first conductive resin layer 131b and a second extending portion 142' disposed to extend from the body cover portion 143 between the second plating layer 132c and the second conductive resin layer 132b. The first and second extending portions 141' and 142' may have first and second openings H1 and H2, respectively.

The first conductive resin layer 131b may be in contact with the first plating layer 131c through the first opening H1, and the second conductive resin layer 132b may be in contact with the second plating layer 132c through the second opening H2. For example, the first opening H1 may be filled with the first plating layer 131c, and the second opening H2 may be filled with the second plating layer 132c.

The Si organic compound layer 140' may be formed by forming the first and second electrode layers 131a and 132a on the body 110 including dielectric layers and internal electrodes, forming the first and second conductive resin layers 131b and 132b on the first and second electrode layers 131a and 132a, respectively, forming a silicon (Si) organic compound layer on an exposed external surface of the body 110 and the first and second conductive resin layers 131b and 132b, and removing a portion of the Si organic compound layer formed on the first and second conductive resin layers 131b and 132b to form the first and second openings H1 and H2.

A method of removing a region in which the openings H1 and H2 to be formed, may be, for example, laser processing, mechanical polishing, dry etching, wet etching, shadowing deposition using a tape protective layer, or the like.

In this case, an area of the first opening H1 may be 20 to 90% of an area of the first extending portion 141', an area of the second opening H2 may be 20 to 90% of an area of the second extending portion 142'.

When the area of the first opening H1 is less than 20% of the area of the first extending portion 141', electrical connectivity between the first plating layer 131c and the first conductive resin layer 131b is deteriorated to increase ESR. On the other hand, when the area of the first opening H1 is greater than 90% of the area of the first extending portion 141', an effect of improving bending strength and moisture resistance reliability of the Si organic compound layer 140' may be insufficient.

The first opening H1 may be disposed in one or more of the first band portion B1 and the first connection portion C1, and the second opening H2 may be disposed in one or more of the second band portion B2 and the second connection portion C2.

As illustrated in FIG. 6, the first extending portion 141' may have a form in which the first opening portion H1 is only disposed in the first connecting portion C1, and the second extending portion 142' may have a form in which a second opening portion H2 is only disposed in the second connection portion C2.

In addition, as illustrated in FIG. 8, the first extending portion 141" of an Si organic compound layer 140" may have a form in which the first opening portion H1 is disposed in both the first connection portion C1 and the first band portion B1, and the second extending portion 142" of an Si organic compound layer 140" may have a form in which the second opening H2 is disposed in both the second connection portion C2 and the second band portion B2.

The shape and the number of the openings H1 and H2 are not limited, and each of the openings H1 and H2 may have a shape such as a circle, a rectangle, an ellipse, a rectangle having rounded corners, and the like, and may have an irregular shape.

As described above, a multilayer electronic component may include a silicon (Si) organic compound layer having a body cover portion disposed in a region in which an electrode layer and a conductive resin layer are not disposed, of external surfaces of a body, and an extending portion disposed to extend from the body cover portion between the conductive resin layer and a plating layer of an external electrode, and thus, may improve bending strength.

In addition, the Si organic compound layer may be provided to improve moisture resistance reliability.

While embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers, and first and second internal electrodes alternately stacked with respective dielectric layers interposed therebetween, the body having first and second surfaces opposing each other in a stacking direction, third and fourth surfaces connected to the first and second surfaces and opposing each other, and fifth and sixth surfaces connected to the first to fourth surfaces and opposing each other;
a first external electrode including a first electrode layer connected to the first internal electrode, a first conductive resin layer disposed on the first electrode layer, and a first plating layer disposed on the first conductive resin layer, and each having a first connection portion disposed on the third surface of the body and a first band portion extending from the first connection portion to a portion of each of the first, second, fifth, and sixth surfaces;
a second external electrode including a second electrode layer connected to the second internal electrode, a second conductive resin layer disposed on the second electrode layer, and a second plating layer disposed on the second conductive resin layer, and each having a second connection portion disposed on the fourth surface of the body and a second band portion extending from the second connection portion to a portion of each of the first, second, fifth, and sixth surfaces; and
a silicon (Si) organic compound layer having a body cover portion disposed on a region of external surfaces of the body between the first and second conductive resin layers, a first extending portion disposed to extend from the body cover portion to a region between the first band portion of the first conductive resin layer and the first band portion of the first plating layer, and a second extending portion disposed to extend from the body cover portion to a region between the second band portion of the second conductive resin layer and the second band portion of the second plating layer,
wherein Tb/Ta is 0.5 or more and 0.9 or less, where a thickness of the first conductive resin layer on the first band portion of the first electrode layer is defined as 'Ta' and a thickness of the first extending portion is defined as 'Tb'.

2. The multilayer electronic component of claim 1, wherein the Si organic compound layer includes alkoxy silane.

3. The multilayer electronic component of claim 1, wherein the first and second conductive resin layers include a conductive metal and a base resin.

4. The multilayer electronic component of claim 1, wherein the first and second electrode layers include a conductive metal and glass.

5. The multilayer electronic component of claim 1, further comprising:
first and second additional plating layers disposed on the first and second plating layers, respectively.

6. The multilayer electronic component of claim 1, wherein each of the first and second extending portions has an opening.

7. The multilayer electronic component of claim 1, wherein the body cover portion is disposed on the external surfaces of the body on which the first and second electrode layers and the first and second conductive resin layers are not disposed.

8. The multilayer electronic component of claim 1, wherein the first extending portion extends only between the first band portion of the first conductive resin layer and the first band portion of the first plating layer, and
wherein the second extending portion extends only between the second band portion of the second conductive resin layer and the second band portion of the second plating layer.

9. The multilayer electronic component of claim 1, wherein the Si organic compound layer is disposed on the first, second, fifth, and sixth surfaces of the body.

10. The multilayer electronic component of claim 9, wherein the Si organic compound layer is disposed on the first connection portion of the first conductive resin layer and disposed on the second connection portion of the second conductive resin layer.

11. A multilayer electronic component comprising:
a body including dielectric layers, and first and second internal electrodes alternately stacked with respective dielectric layers interposed therebetween, the body having first and second surfaces opposing each other in a stacking direction, third and fourth surfaces connected to the first and second surfaces and opposing each other, and fifth and sixth surfaces connected to the first to fourth surfaces and opposing each other;
a first external electrode including a first electrode layer connected to the first internal electrode, a first conductive resin layer disposed on the first electrode layer, and a first plating layer disposed on the first conductive resin layer, and each having a first connection portion disposed on the third surface of the body and a first band portion extending from the first connection portion to a portion of each of the first, second, fifth, and sixth surfaces;
a second external electrode including a second electrode layer connected to the second internal electrode, a second conductive resin layer disposed on the second electrode layer, and a second plating layer disposed on the second conductive resin layer, and each having a second connection portion disposed on the fourth surface of the body and a second band portion extending from the second connection portion to a portion of each of the first, second, fifth, and sixth surfaces; and a silicon (Si) organic compound layer having a body cover portion disposed on a region of external surfaces of the body between the first and second conductive resin layers, a first extending portion disposed to extend from the body cover portion to a region between the first conductive resin layer and the first plating layer, and a second extending portion disposed to extend from the body cover portion to a region between the second conductive resin layer and the second plating layer, wherein the first and second extending portions have first and second openings, respectively, and wherein Tb/Ta is 0.5 or more and 0.9 or less, where a thickness of the first conductive resin layer on the first band portion of the first electrode layer is defined as 'Ta' and a thickness of the first extending portion is defined as 'Tb'.

12. The multilayer electronic component of claim 11, wherein an area of the first opening is 20 to 90% of an area of the first extending portion, and an area of the second opening is 20 to 90% of an area of the second extending portion.

13. The multilayer electronic component of claim 11, wherein the first opening is disposed in at least one of the first band portion or the first connection portion, and the second opening is disposed in at least one of the second band portion or the second connection portion.

14. The multilayer electronic component of claim 11, wherein the Si organic compound layer includes alkoxy silane.

15. The multilayer electronic component of claim 11, wherein the first and second conductive resin layers include a conductive metal and a base resin.

16. The multilayer electronic component of claim 11, wherein the first and second electrode layers include a conductive metal and glass.

17. The multilayer electronic component of claim 11, further comprising:

first and second additional plating layers disposed on the first and second plating layers, respectively.

18. The multilayer electronic component of claim 11, wherein the Si organic compound layer is disposed on the first, second, fifth, and sixth surfaces of the body.

19. The multilayer electronic component of claim 18, wherein the Si organic compound layer is disposed on the first connection portion of the first conductive resin layer and disposed on the second connection portion of the second conductive resin layer.

20. A multilayer electronic component comprising:

a body including dielectric layers, and first and second internal electrodes alternately stacked with a respective dielectric layer interposed therebetween in a stacking direction, the first and second internal electrodes being exposed to opposing end surfaces of the body in a length direction perpendicular to the stacking direction;

first and second external electrodes comprising:

first and second electrode layers disposed on the end surfaces of the body and connected to the first and second internal electrodes, respectively, the first and second electrode layers further extending inwardly in the length direction along surfaces of the body that connect the end surfaces to each other;

first and second conductive resin layers to cover the first and second electrode layers, respectively; and first and second plating layers to cover the first and second conductive resin layers, respectively; and a silicon (Si) organic compound layer disposed to cover exterior surfaces of the body, the first and second electrode layers, and the first and second conductive resin layers, wherein the Si organic compound layer has one or more first openings between the first conductive resin layer and the first plating layer such that the first conductive resin layer and the first plating layer are in contact through the one or more first openings, and has one or more second openings between the second conductive resin layer and the second plating layer such that the second conductive resin layer and the second plating layer are in contact through the one or more second openings, and wherein Tb/Ta is 0.5 or more and 0.9 or less, where a thickness of the first conductive resin layer on a first band portion of the first electrode layer in the stacking direction is defined as 'Ta' and a thickness of the Si organic compound layer above or below the first band portion of the first electrode layer in the stacking direction is defined as 'Tb'.

21. The multilayer electronic component of claim 20, wherein the one or more first and second openings are arranged in only regions corresponding to the end surfaces of the body in the length direction.

22. The multilayer electronic component of claim 20, wherein the one or more first openings are arranged in an entire region between the first conductive resin layer and the first plating layer, and wherein the one or more second openings are arranged in an entire region between the second conductive resin layer and the second plating layer.

23. The multilayer electronic component of claim 20, wherein the Si organic compound layer is disposed on the surfaces of the body that connect the end surfaces to each other.

24. The multilayer electronic component of claim 23, wherein the Si organic compound layer is disposed on portions of the first and second conductive resin layers in the length direction.

* * * * *